(12) United States Patent
Kim

(10) Patent No.: US 7,477,280 B2
(45) Date of Patent: Jan. 13, 2009

(54) IMAGE FORMING APPARATUS HAVING SCANNING BEAM BLOCKING MEMBER

(75) Inventor: Young-min Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 428 days.

(21) Appl. No.: 11/443,023

(22) Filed: May 31, 2006

(65) Prior Publication Data

US 2007/0076085 A1 Apr. 5, 2007

(30) Foreign Application Priority Data

Sep. 30, 2005 (KR) .................... 10-2005-0092287

(51) Int. Cl.
*B41J 2/435* (2006.01)
(52) U.S. Cl. ...................................... 347/263
(58) Field of Classification Search ............. 347/263
See application file for complete search history.

(56) References Cited

U.S. PATENT DOCUMENTS

| 5,157,416 | A | * | 10/1992 | Kinoshita et al. ........... 347/263 |
| 5,786,594 | A | | 7/1998 | Ito et al. |
| 7,002,615 | B2 | * | 2/2006 | Shim .......................... 347/263 |

FOREIGN PATENT DOCUMENTS

| EP | 0 586 043 A2 | 6/1993 | |
| JP | 56-22461 | 3/1981 | |
| JP | 04-029168 | * 1/1992 | ................ 399/216 |
| JP | 05-019603 | 1/1993 | |
| JP | 06-202390 | 7/1994 | |
| JP | 06-297755 | 10/1994 | |
| JP | 06-305185 | 11/1994 | |
| JP | 2002-182443 | 6/2002 | |
| JP | 2003-036008 | 2/2003 | |
| JP | 2003-295082 | 10/2003 | |
| KR | 1998-30974 | 7/1998 | |
| KR | 1999-0017801 | 6/1999 | |

OTHER PUBLICATIONS

Computer-generated translation of JP 2003-295082 (published on Oct. 2003) cited in the IDS filed on Jun. 22, 2007.*
Office Action issued by the Korean Intellectual Property Office in Korean Patent Application No. 2005-92287 on Sep. 22, 2007.
Search Report issued on Feb. 21, 2007 by the European Patent Office for European Patent Application 06121343.5-1234.

* cited by examiner

*Primary Examiner*—Huan H Tran
(74) *Attorney, Agent, or Firm*—Stein, McEwen & Bui, LLP

(57) ABSTRACT

The invention provides an image forming apparatus that includes a light source receiving printing data to generate a scanning beam; a polygon mirror receiving the scanning beam to scan in a predetermined width; a reflection mirror reflecting the scanned beam; a blocking member moving between a blocking position blocking the scanning beam and an non-blocking position allowing the scanning beam to pass; a developing cartridge provided to move inside/outside of the image forming apparatus to move the blocking member, and accommodating a photosensitive body receiving the scanning beam reflected by the reflection mirror; a sensor interposed between the polygon mirror and the reflection mirror to detect a first position of the scanned beam; and a controller determining whether the developing cartridge is mounted on the basis of the detected signal of the sensor.

20 Claims, 6 Drawing Sheets

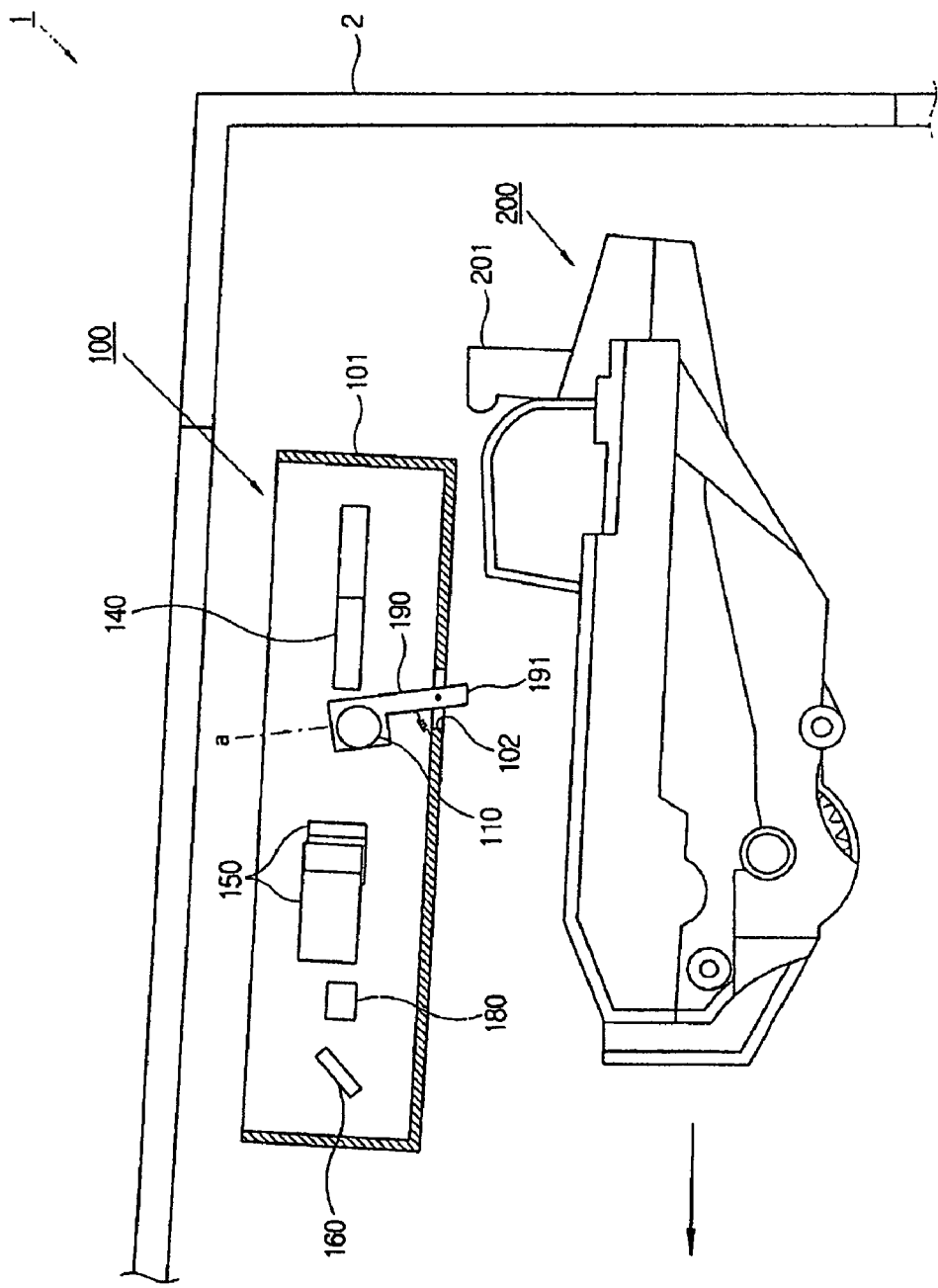

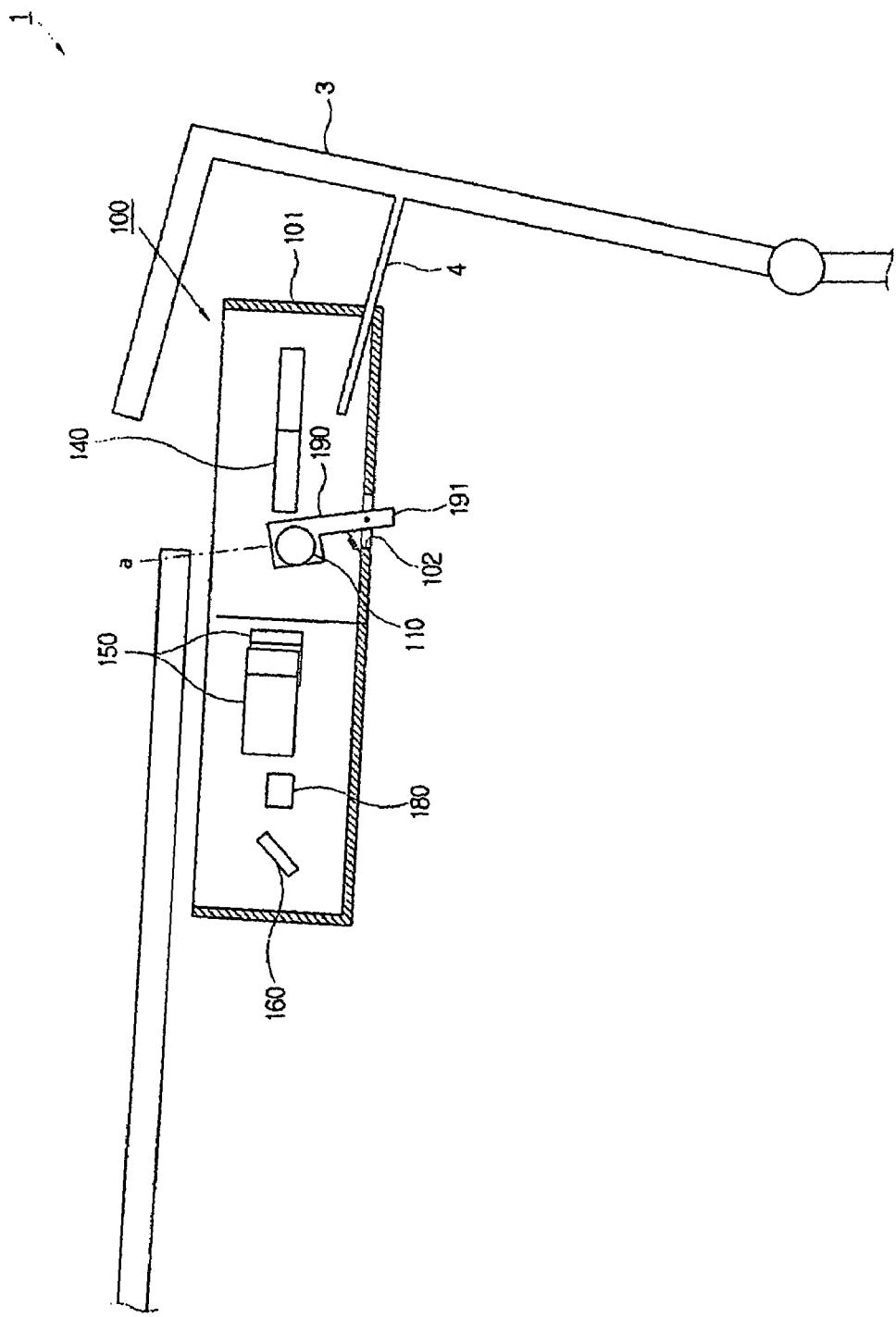

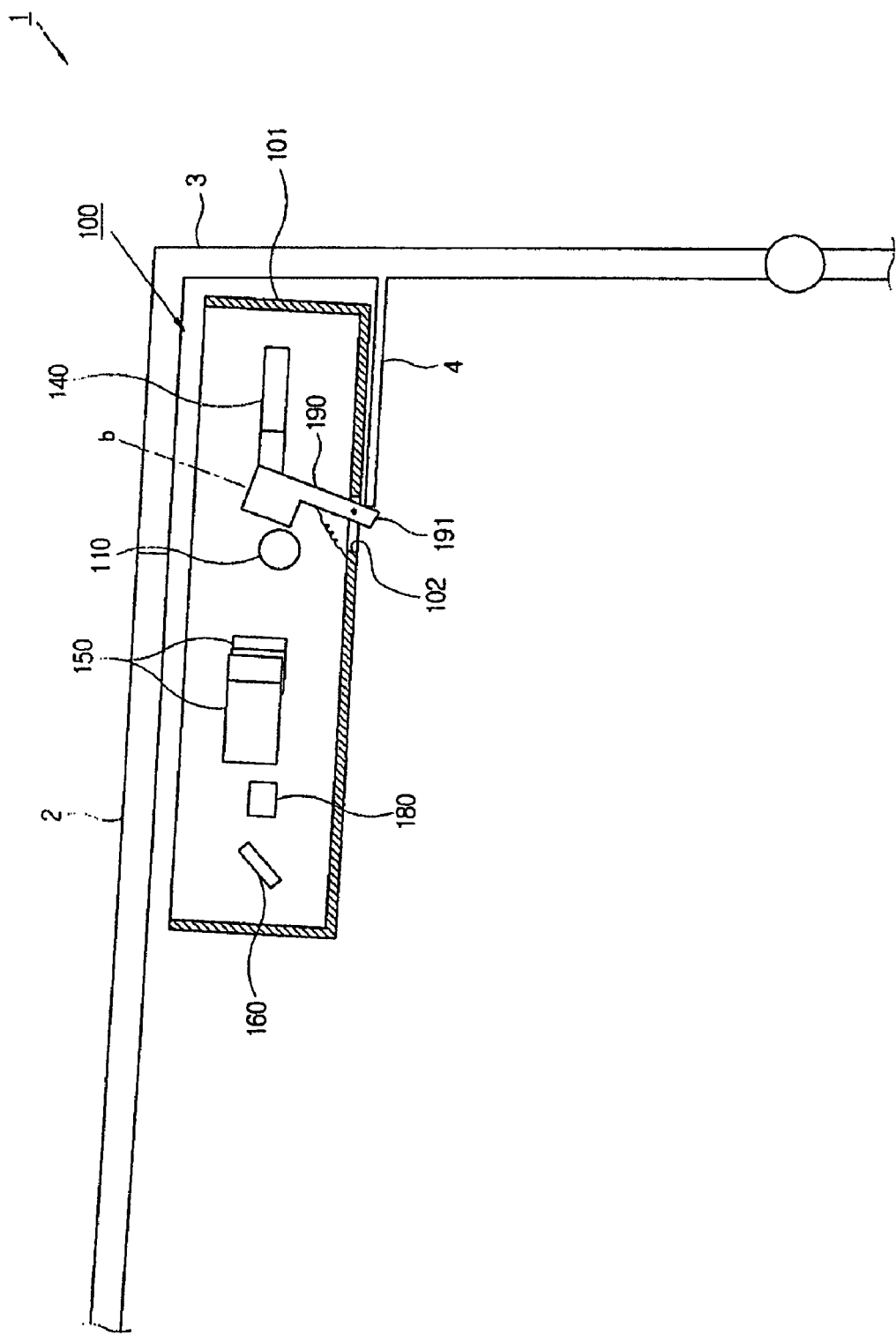

IMAGE FORMING APPARATUS HAVING SCANNING BEAM BLOCKING MEMBER

CROSS-REFERENCE TO RELATED APPLICATIONS

This application claims priority from Korean Patent Application No. 2005-92287, filed on Sep. 30, 2005, in the Korean Intellectual Property Office, the disclosure of which is incorporated herein by reference.

BACKGROUND OF THE INVENTION

1. Field of the Invention

Aspects of the present invention relate to an image forming apparatus and more particularly, to an electrophotographic image forming apparatus comprising a blocking member blocking or passing a scanning beam.

2. Description of the Related Art

An image forming apparatus generates a scanning beam, such as a laser, based on printing data, and enables toner to be developed according to a surface voltage distribution of a photosensitive body that receives the scanning beam.

Because of potential health and safety issues, the scanning beam should be prevented from escaping outside the image forming apparatus, and exposure of users to the scanning beam should be prevented.

In response to such a requirement, Japanese Patent First Publication Nos. 5-19603, 6-297755, and 6-305185 have been disclosed.

SUMMARY OF THE INVENTION

It is an aspect of the invention to provide an image forming apparatus in which outside exposure to a scanning beam is prevented.

Additional aspects and/or advantages of the invention will be set forth in part in the description which follows and, in part, will be obvious from the description, or may be learned by practice of the invention.

The foregoing and/or other aspects of the present invention can be achieved by providing an image forming apparatus comprising: a light source that receives printing data to generate a scanning beam; a polygon mirror that receives the scanning beam and that scans the scanning beam in a predetermined width; a reflection mirror that reflects the scanned beam; a blocking member that moves between a blocking position blocking the scanning beam and a non-blocking position allowing the scanning beam to pass; a developing cartridge comprising a photosensitive body that receives the scanning beam reflected by the reflection mirror, wherein the developing cartridge is removably mounted in the image forming apparatus and wherein the developing cartridge interacts with the blocking member to move the blocking member when the developing cartridge is installed in or removed from the image forming apparatus; a sensor interposed between the polygon mirror and the reflection mirror to detect the scanning beam when the scanning beam is not blocked by the blocking member; and a controller that determines whether the developing cartridge is mounted in the image forming apparatus on the basis of whether the scanning beam is detected by the sensor.

According to an aspect of the present invention, the blocking member is interposed between the light source and the polygon mirror such that when the blocking member is in the blocking position, the blocking member blocks the scanning beam of the light source.

According to an aspect of the present invention, the blocking member is interposed between the polygon mirror and the reflection mirror such that when the blocking member is in the blocking position, the beam scanned by the polygon mirror is blocked between the polygon mirror and the reflection mirror.

According to an aspect of the present invention, the image forming apparatus further comprises a casing that accommodates the light source, the polygon mirror and the reflection mirror, and wherein the blocking member is movably supported on the casing.

According to an aspect of the present invention, the controller controls an on or off operation of the light source on the basis of whether the developing cartridge is mounted in the image forming apparatus.

The foregoing and/or another aspects of the present invention can be achieved by providing a image forming apparatus comprising: a light source that receives printing data to generate a scanning beam; a polygon mirror that receives the scanning beam and that scans the scanning beam in a predetermined width; a reflection mirror that reflects the scanned beam; a blocking member that moves between a blocking position blocking the scanning beam and a non-blocking position allowing the scanning beam to pass; a housing that includes a cover hingedly coupled to the housing, wherein the cover rotatably opens and closes; a sensor interposed between the polygon mirror and the reflection mirror to detect the scanning beam when the scanning beam is not blocked by the blocking member; and a controller that determines whether the cover is open or closed on the basis whether the scanning beam is detected by the sensor.

According to an aspect of the present invention, the controller controls an on and off operation of the light source on the basis of whether the cover is open or closed.

According to an aspect of the present invention, the image forming apparatus further comprises a developing cartridge accommodating a photosensitive body receiving the scanning beam reflected by the reflection mirror, and removably mounted in the image forming apparatus when the cover is open.

According to an aspect of the present invention, a guide hole is formed in the casing, and the blocking member further comprises an arm that extends through the guide hole.

According to an aspect of the present invention, the developing cartridge moves the arm when of the developing cartridge is installed in or removed from the image forming apparatus.

According to an aspect of the present invention, the casing further comprises a seal to prevent an inflow of alien substances through the guide hole.

It is to be understood that both the foregoing general description and the following detailed description are exemplary and explanatory and are intended to provide further explanation of the invention as claimed.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 2A and 2B are sectional views illustrating an installing process of an image forming apparatus according to a first embodiment of the present invention, FIGS. 3A and 3B are sectional views illustrating an installing process of an image forming apparatus according to a second embodiment of the present invention.

DETAILED DESCRIPTION OF THE EMBODIMENTS

Figure 1:
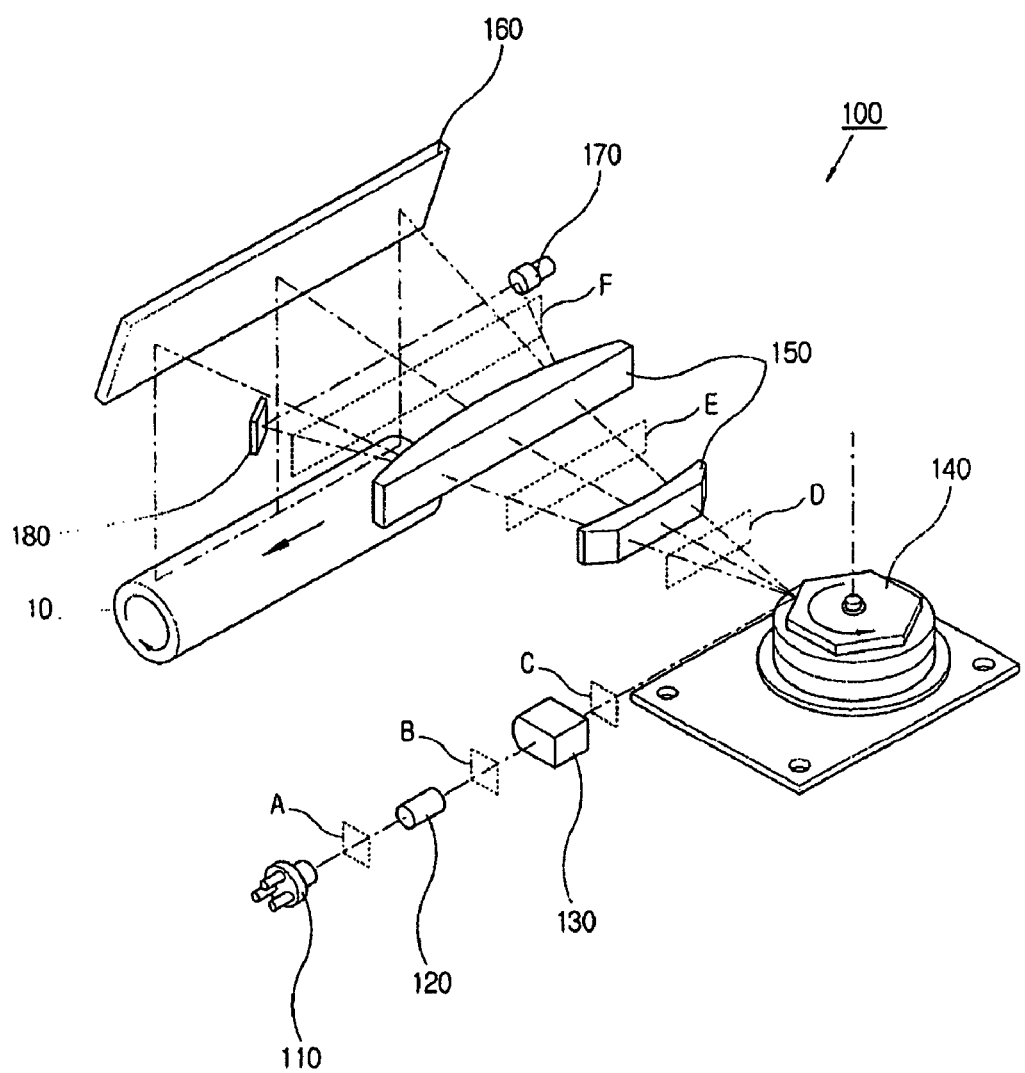
FIG. 1 is an exploded perspective view illustrating a laser scanning unit according to an aspect of the present invention.

Reference will now be made in detail to the embodiments of the present invention, examples of which are illustrated in the accompanying drawings, wherein like reference numerals refer to like elements throughout. When the same elements are present in more than one embodiment, they will typically be described in the first embodiment and the description may be omitted in the discussion of the other embodiments. The embodiments are described below so as to explain the present invention by referring to the figures.

FIG. 1 is an exploded perspective view illustrating a laser scanning unit 100. A light source 110 receives printing data and generates and scans a laser scanning beam corresponding to the printing data. The scanning beam is directed to a polygon mirror 140 through a collimating lens 120 and a cylinder lens 130. The polygon mirror 140 reflects the scanning beam while rotating at a high speed to scan the beam in a predetermined width. The scanned beam passes through an fθ lens 150 and then is reflected by a reflection mirror 160 to be scanned on an external photosensitive body 10. A surface of the photosensitive body 10 scanned by the scanning beam is supplied with a predetermined voltage to form an electrostatic latent image.

In the laser scanning unit 100 with such a configuration, a blocking member (see 190 in FIG. 2A) can block the scanning beam by being positioned in one of the locations A through F of FIG. 1, as will be described below.

Particularly, if the blocking member 190 is positioned in one of the locations A, B and C of FIG. 1, the scanning beam between the light source 110 and the polygon mirror 140 is made of a singular beam. Thus, the blocking member 190 can be advantageously formed small in size.

If the blocking member is positioned on one of the locations D, E or F in FIG. 1, the blocking member cannot be as small as it can be in the locations A, B or C in FIG. 1, since the scanning beam has a width created by being scanned by the polygon mirror 140. However, a relatively small blocking area can be provided in comparison with the width of the scanning beam reflected to the photosensitive body 10 by the reflection mirror 160.

Reference numeral 170 in FIG. 1 denotes a sensor that detects a first position of the scanning beam scanned by the polygon mirror 140, and reference numeral 180 denotes a position detecting reflection mirror to reflect the beam onto the sensor 170 when the scanned beam is positioned at the final position. According to aspects of the present invention, the sensor 170 may be positioned in any location from which it detects the scanning beam when the scanning beam is not blocked by the blocking member 190 and does not detect the scanning beam when the scanning beam is blocked by the blocking member.

Figure 2B:
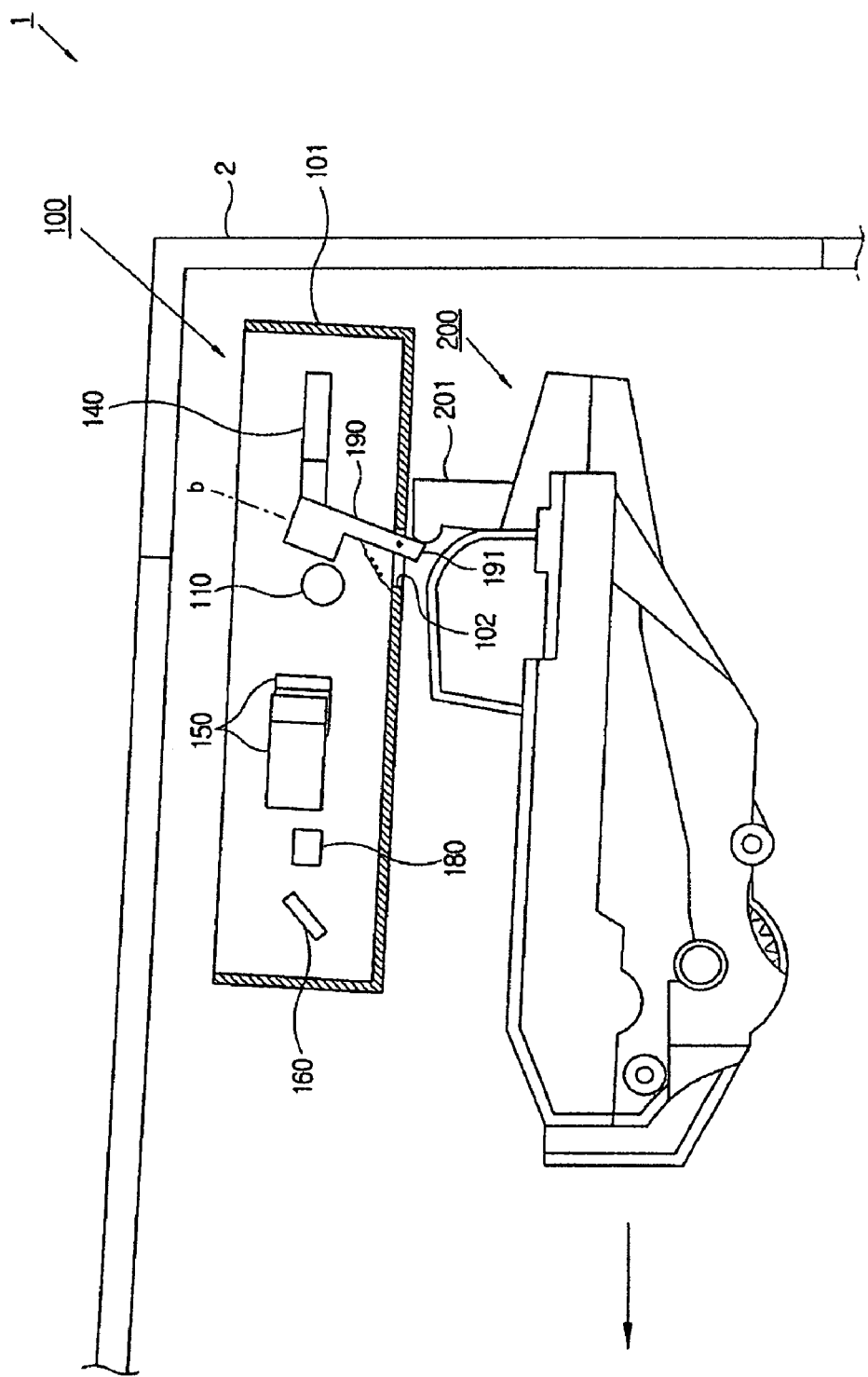

FIGS. 2A and 2B are side views illustrating an interrelation between the laser scanning unit 100 and a developing cartridge 200, when the blocking member 190 is positioned at the A, B or C locations in FIG. 1.

The laser scanning unit 100 is fixed in the inside of the housing 2 of the image forming apparatus 1, and the developing cartridge 200 is detachably mounted to the image forming apparatus 1. Accordingly, the laser scanning unit 100 and the developing cartridge 200 can interact when the developing cartridge 200 is installed into and detached from the image forming apparatus 1.

More particularly, the laser scanning unit 100 comprises the blocking member 190 interposed between the light source 110 and the polygon mirror 140.

The blocking member 190 may be hingedly coupled to a casing 101 to move between a blocking position (see position "a" in FIG. 2A) blocking the scanning beam generated from the light source 110 and a non-blocking position (see position "b" in FIG. 2B) that allows the scanning beam to pass without being blocked. The blocking member 190 is not limited to this exact configuration. For example, the casing 101 and the blocking member 190 may be slidably coupled to move the blocking member 190, or the blocking member 190 may be integrally formed with the casing 101 to move through elastic deformation.

The blocking member 190 is positioned on the first blocking position "a" to move to the non-blocking position "b" when a developing cartridge 200 is mounted in the image forming apparatus 1 and then to be restored to the blocking position "a" when the developing cartridge 200 is removed from the image forming apparatus 1. An elastic member such as a spring can be used to bias the blocking member 190 so that the blocking member 190 is restored to the blocking position "a" when the developing cartridge 200 is removed.

The blocking member 190 comprises an arm 191 that extends through a guide hole 102 provided in the casing 101. The arm 191 interacts with the developing cartridge 200 to move the blocking member 190 into the non-blocking position "b" when the developing cartridge 200 is mounted in the image forming apparatus 1, so that the blocking member 190 does not block the scanning beam generated from the light source 110. Then, when the developing cartridge 200 is removed from the image forming apparatus 1, the arm 191 no longer interacts with the developing cartridge 200 and the blocking member moves to the blocking position "a".

FIG. 2A illustrates a state in which the developing cartridge 200 is being installed into, but is not yet mounted in the image forming apparatus 1, and FIG. 2B illustrates the state in which the developing cartridge 200 has been mounted in the image forming apparatus 1.

In the developing cartridge 200, a projection 201 is formed to move the arm 191 of the blocking member 190. The projection 201 can be provided as a part of the developing cartridge 200 without deforming the outside shape of the developing cartridge 200, or with deforming an outside part thereof. Alternatively, an extra member can be provided attached to the developing cartridge 200.

As shown in FIGS. 2A and 2B, before the developing cartridge 200 is mounted to the image forming apparatus 1, the blocking member 190 is positioned in the blocking position "a". After the developing cartridge 200 is mounted, the blocking member 190 is positioned in the non-blocking position "b" due to the moving of the arm 191 caused by interaction with the projection 201.

FIGS. 3A and 3B are side views illustrating an interrelation between the laser scanning unit 100 and the cover 3 when the blocking member 190 is positioned at locations A, B, or C in FIG. 1. Since the configuration of the laser scanning unit 100 is substantially the same as that in FIGS. 2A and 2B, the description thereof will be omitted.

The cover 3 is provided to be hingedly coupled to the housing 2 and to rotatably open and close. The cover 3 is opened when the developing cartridge 200 is installed in or removed from the image forming apparatus 1 and is closed when the developing cartridge has been mounted to the image forming apparatus 1. The cover 3 is kept closed during normal operation of the image forming apparatus.

A rib 4 is projectedly formed in the cover 3 to move the blocking member 190. Accordingly, when the cover 3 is rotated to a closed position, the rib 4 contacts the arm 191 of the blocking member 190, thereby moving the arm 191 so that the blocking member 190 is moved to the non-blocking position "b". An elastic member such as a spring can be used to bias the blocking member 190 so that the blocking member 190 is restored to the blocking position "a" when the cover is opened.

The rib 4 is projectedly formed in the cover 3 to rotate with respect to the casing 101 of the laser scanning unit 100. To this end, the shape of the casing 101 can be suitably provided or modified. Alternatively, the rib 4 may be provided transversely at a side edge of the cover 3, and an extension may be formed at a lower part of the arm 191 of the blocking member 190 to move in contact with the rib 4.

In the embodiments of the present invention described above, the blocking member 190 is positioned between the light source 110 and the polygon mirror 140. However, the blocking member 190 can also be positioned so in locations D, E or F in FIG. 1, so that the blocking member 190 can be moved to block the scanning beam in these positions. In such a case, the blocking area of the blocking member 190 must be larger in comparison with the above embodiment of the present invention. However, even in such a case, the blocking area still has a smaller area than would be required to block the scanning beam after the scanning beam passes through the reflection mirror 160 and before the scanning beam exits to the outside of the laser scanning unit 100.

In the above embodiments, a seal can be provided to the guide hole 102 formed on the casing 101 of the laser scanning unit 100 to block the inflow of alien substances from the outside, such as dust or airborne toner particles. Such a seal can be made of a flexible material such as sponge or rubber, or may be in the form of a film or tape so that the smooth movement of the blocking member 190 is not prevented.

Figure 4:
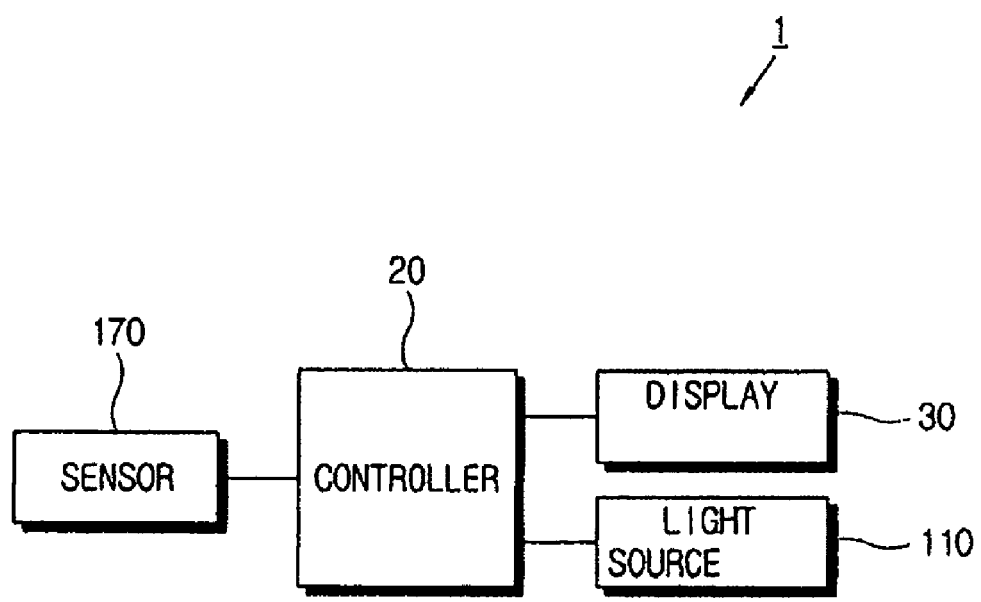
FIG. 4 is a block diagram illustrating a control operation of the image forming apparatus according to the present invention.

FIG. 4 is a block diagram illustrating a control operation of the laser scanning unit 100 having the blocking member 190.

In the image forming apparatus 1, a controller 20 controlling each component is provided, and a display 30 controlled by the controller 20 is provided to display the state of the image forming apparatus 1. The controller 20 controls an on and off operation of the light source 110 of the laser scanning unit 100 based on the signal detected from the sensor 170 provided in the image forming apparatus 100 in FIG. 1.

For example, in the image forming apparatus 1 having the laser scanning unit 100 and the developing cartridge 200 as shown in FIGS. 2A and 2B, the first position of the scanning beam of the light source 110 can be detected through the sensor 170 in FIG. 1 only when the developing cartridge 200 is mounted, (that is, the state of 2B in FIG. 1). As a result, the controller 20 can determine whether or not the developing cartridge 200 is mounted to the image forming apparatus 1 through a detecting signal of the sensor 170. That is, if the developing cartridge 200 is not mounted to the image forming apparatus 1, the blocking member 190 is positioned in the blocking position "a" as shown in FIG. 2A, and the scanning beam does not reach the sensor 170. On the other hand, if the developing cartridge 200 is mounted to the image forming apparatus 1, the blocking member 190 is positioned in the non-blocking position "b" as shown in FIG. 2B, and the scanning beam reaches the sensor 170.

Accordingly, the controller 20 can inform a user through the display 30 when the developing cartridge 200 is not mounted, and further can cut off electric power of the light source 110 so that the scanning beam is not generated.

Similarly, in the image forming apparatus 1 having the laser scanning unit 100 and the cover 3 as shown in FIGS. 3A and 3B, the controller 20 can determine the cover 3 whether the cover is opened or closed.

Accordingly, the controller 20 informs a user through the display 30 if the cover 3 is not closed, and can cut off an electric power of the light source 110 to prevent the scanning beam from being generated.

As described above, when the blocking member is interposed between the light source and the polygon mirror, or between the polygon mirror and the reflection mirror, the scanning beam is blocked with a relatively small blocking area and with improved blocking efficiency.

Furthermore, a determination can be made as to whether or not the developing cartridge is mounted or whether or not the cover is closed based on whether or not the scanning beam is detected by the sensor, since the scanning beam is blocked when the developing unit is removed or when the cover is opened. The result of this determination can be used to control the on and off operation of the light source, thereby providing addition protection to users when the developing cartridge is removed or the cover is open. Also the image forming apparatus advantageously need not have an extra sensor to detect whether the developing cartridge is mounted in the image forming apparatus or the cover is open or closed.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image forming apparatus comprising:
   a light source that receives printing data to generate a scanning beam;
   a polygon mirror that receives the scanning beam and that scans the scanning beam in a predetermined width;
   a reflection mirror that reflects the scanned beam;
   a blocking member that moves between a blocking position blocking the scanning beam and a non-blocking position allowing the scanning beam to pass;
   a developing cartridge comprising a photosensitive body that receives the scanning beam reflected by the reflection mirror, wherein the developing cartridge is removably mounted in the image forming apparatus and wherein the developing cartridge interacts with the blocking member to move the blocking member when the developing cartridge is installed into or removed from the image forming apparatus;
   a sensor interposed between the polygon mirror and the reflection mirror to detect the scanning beam when the scanning beam is not blocked by the blocking member; and
   a controller that determines whether the developing cartridge is mounted in the image forming apparatus based on whether the scanning beam is detected by the sensor.

2. The image forming apparatus according to claim 1, wherein the blocking member is interposed between the light source and the polygon mirror such that when the blocking member is in the blocking position, the blocking member blocks the scanning beam of the light source between the light source and the polygon mirror.

3. The image forming apparatus according to claim 1, wherein the blocking member is interposed between the polygon mirror and the reflection mirror such that when the blocking member is in the blocking position, the blocking member blocks the beam scanned by the polygon mirror between the polygon mirror and the reflection mirror.

4. The image forming apparatus according to claim 1, further comprising a casing that accommodates the light source, the polygon mirror and the reflection mirror, and
wherein the blocking member is movably supported on the casing.

5. The image forming apparatus according to claim 4, wherein a guide hole is formed in the casing, and the blocking member further comprises an arm that extends through the guide hole.

6. The image forming apparatus according to claim 5, wherein the developing cartridge moves the arm when the developing cartridge is installed in or removed from the image forming apparatus such that the blocking member is in the non-blocking position when the developing cartridge is mounted in the image forming apparatus.

7. The image forming apparatus according to claim 6, further comprising a resilient member that biases the blocking member such that the blocking member moves to the blocking position when the developing cartridge is removed from the image forming apparatus.

8. The image forming apparatus according to claim 5, wherein the casing further comprises a seal to prevent an inflow of alien substances through the guide hole.

9. The image forming apparatus according to claim 1, wherein the controller controls an on or off operation of the light source based on whether the developing cartridge is mounted in the image forming apparatus.

10. The image forming apparatus of claim 1, further comprising a display and wherein the controller controls the display to notify a user if the developing cartridge is removed from the image forming apparatus.

11. An image forming apparatus comprising:
a light source that receives printing data to generate a scanning beam;
a polygon mirror that receives the scanning beam and that scans the scanning beam in a predetermined width;
a reflection mirror that reflects the scanned beam;
a blocking member that moves between a blocking position blocking the scanning beam and a non-blocking position allowing the scanning beam to pass;
a housing that includes a cover hingedly coupled to the housing, wherein the cover rotatably opens and closes;
a sensor interposed between the polygon mirror and the reflection mirror to detect the scanning beam when the scanning beam is not blocked by the scanning member; and
a controller that determines whether the cover is open or closed based on whether the scanning beam is detected by the sensor.

12. The image forming apparatus of claim 11, wherein the cover comprises a rib that interacts with the blocking member to move the blocking member when the cover is opened or closed.

13. The image forming apparatus of claim 12, wherein the blocking member moves to the blocking position when the cover is opened and moves to the non-blocking position when the cover is closed.

14. The image forming apparatus according to claim 11, wherein the controller controls an on and off operation of the light source on the basis of whether the cover is open or closed.

15. The image forming apparatus according to claim 11, further comprising a developing cartridge accommodating a photosensitive body receiving the scanning beam reflected by the reflection mirror and removably mounted in the image forming apparatus and wherein the developing cartridge is installed into or removed from the image forming apparatus when the cover is open.

16. The image forming apparatus according to claim 11, further comprising a casing that accommodates the light source, the polygon mirror and the reflection mirror, wherein the blocking member is movably supported on the casing.

17. The image forming apparatus according to claim 16, wherein a guide hole is formed in the casing, and the blocking member further comprises an arm that extends through the guide hole.

18. The image forming apparatus according to claim 17, further comprising a resilient member that biases the blocking member such that the blocking member moves to the blocking position when cover is opened.

19. The image forming apparatus according to claim 11, wherein the casing further comprises a seal to prevent an inflow of alien substances through the guide hole.

20. The image forming apparatus of claim 11, further comprising a display and wherein the controller controls the display to notify a user if the cover is open.

* * * * *